Dec. 10, 1963                M. L. CRIPE                3,113,806
              GUIDE BEARING FOR RECIPROCATING STRUCTURES
Filed May 12, 1961                                2 Sheets-Sheet 2
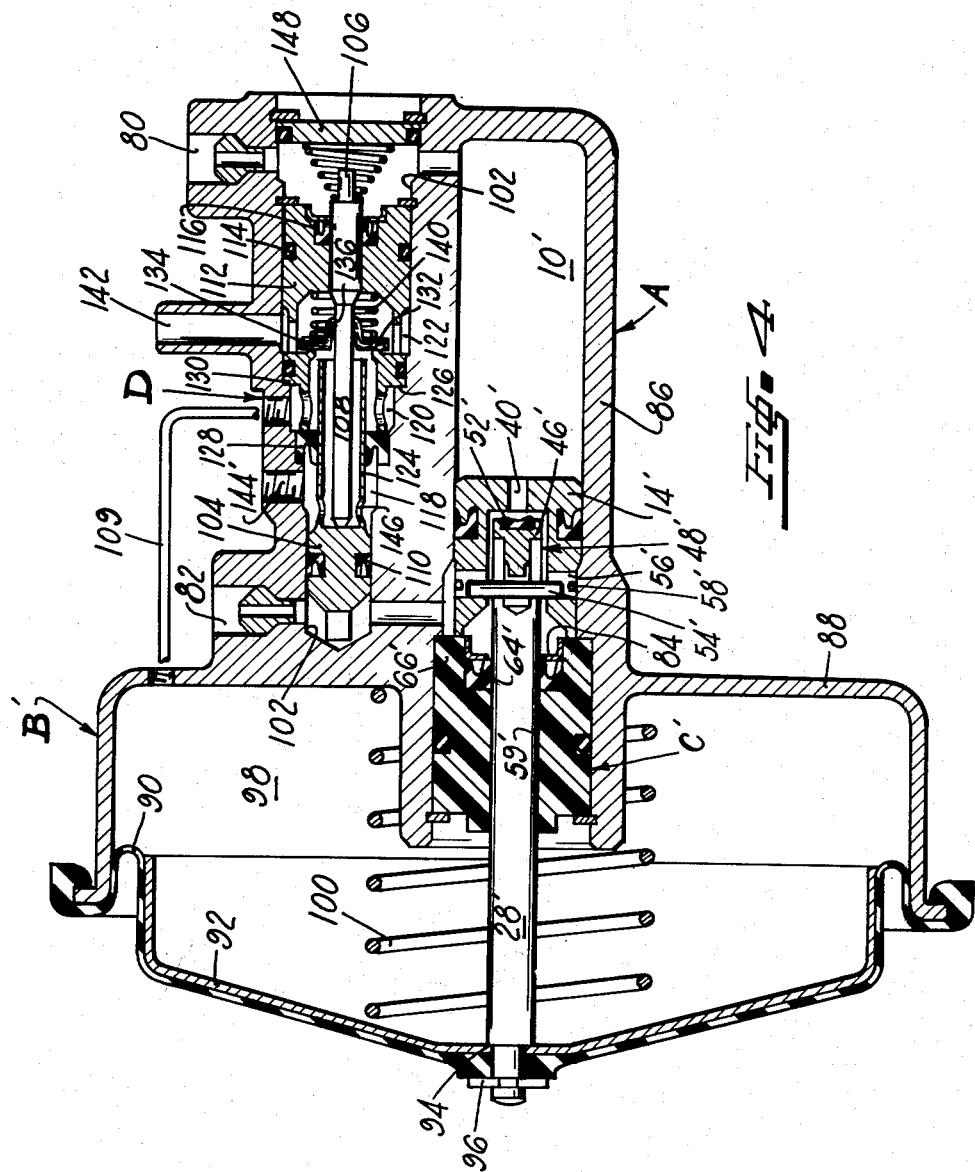
INVENTOR.
MAXWELL L. CRIPE
BY
William P. Hickey
ATTORNEY United States Patent Office 3,113,806
Patented Dec. 10, 1963

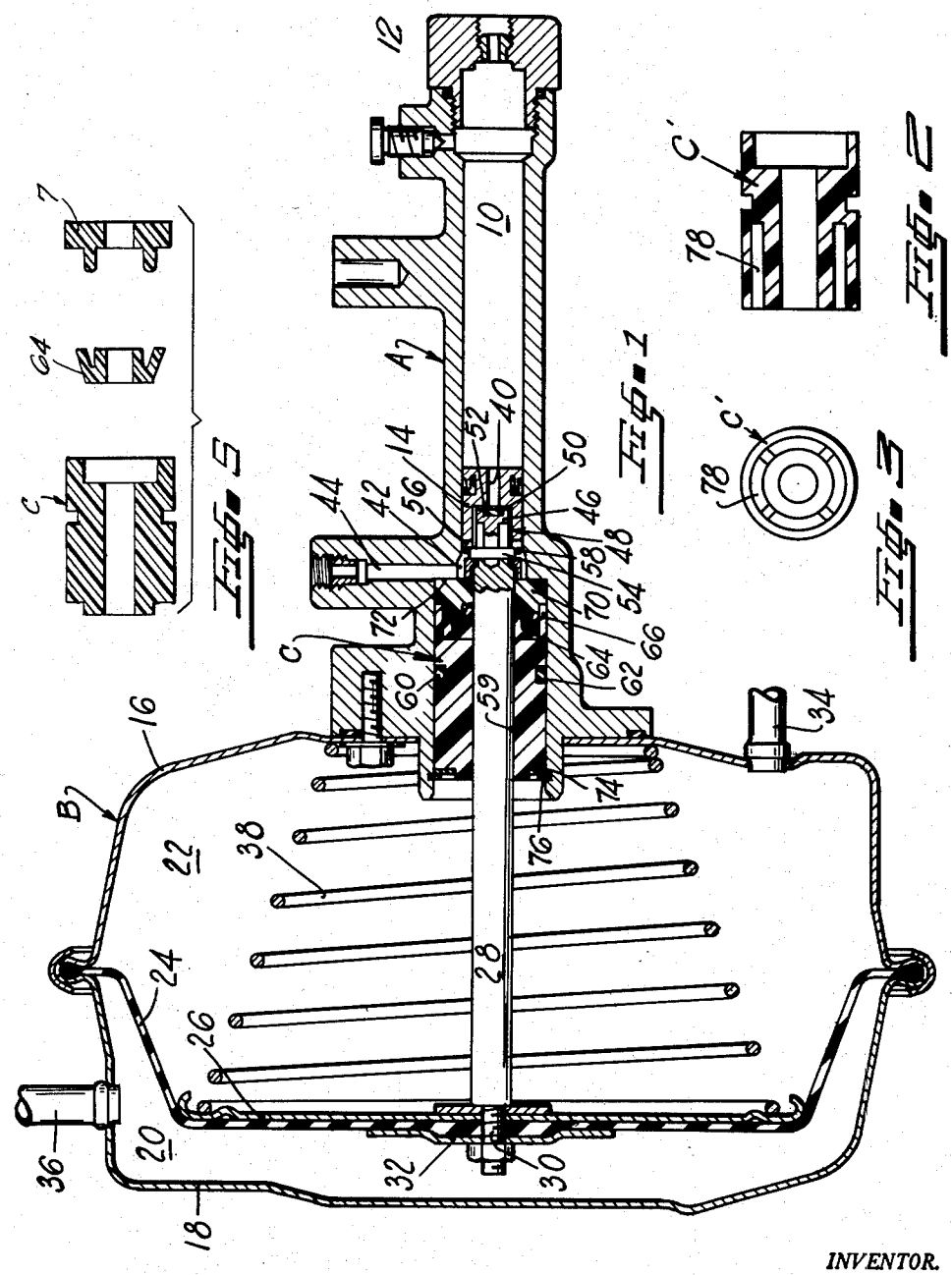

3,113,806
GUIDE BEARING FOR RECIPROCATING
STRUCTURES
Maxwell L. Cripe, South Bend, Ind., assignor to The
Bendix Corporation, South Bend, Ind., a corporation of
Delaware
Filed May 12, 1961, Ser. No. 109,595
5 Claims. (Cl. 308—3.5)

The present invention relates as indicated to guide structures for reciprocating mechanisms; and more particularly to a guide and sealing structure for displacement rods of hydraulic fluid pressurizing devices.

The principal object of the present invention is the provision of a new and improved guiding and sealing structure of the above described type which is very efficient, and which is considerbaly less expensive to manufacture than the structures used heretofore.

Further objects and advantages of the invention will become apparent to those skilled in the art to which it relates from the following description of the preferred embodiment described with reference to the accompanying drawings forming a part of this specificaiton, and in which:

FIGURE 1 is a longitudinal cross sectional view of a hydraulic fluid pressurizing device of the type used in the hydraulic braking systems of automotive vehicles;

FIGURE 2 is another embodiment of the guide structure seen in FIGURE 1;

FIGURE 3 is an end view of the guide seen in FIGURE 2;

FIGURE 4 is a longitudinally extending cross sectional view of another embodiment of the invention; and FIGURE 5 is an exploded sectional view of the seal and support structure of my invention.

The hydraulic pressurizing device shown in FIGURE 1 of the drawing generally comprises a cylinder body A having an axially extending cylinder bore 10 therein from which hydraulic fluid is forced through its outlet connection or port 12 by means of the displacement piston 14. The displacement piston 14 is adapted to be power driven by means of the fluid pressure motor B which is suitably bolted to one end of the cylinder body A. The fluid pressure motor B, shown, is generally formed in two stamped shell sections 16 and 18 which form an internal chamber that is divided into opposing power chambers 20 and 22 by means of a flexible diaphragm 24—the outer periphery of which is suitably sealingly clamped between the shell sections 16 and 18 in the manner shown for example in the Price et al. application Serial No. 842,290. The center section of the diaphragm 24 is suitably stiffened by means of a diaphragm back up plate 26—by means of which, force is exerted upon the piston rod 28 which extends into the cylinder bore 10 to drive the displacement piston 14. Rod 28 may be fastened to the back up plate 26 in any suitable manner; and as shown, is provided with the threaded connection 30 and retaining washer 32 by means of which the center section of the diaphragm is sealingly clamped upon the back up plate 26.

The fluid pressure motor B may be of any suitable type, and as shown in the drawings is a vacuum suspended unit in which vacuum of equal intensity is normally communicated to both of the opposing power chambers 20 and 22, and which is caused to be actuated by the admission of atmospheric pressure to the rear opposing power chamber 20. In the unit shown in the drawing, vacuum is continually admitted to the front opposing power chamber 22 through the vacuum inlet connection 34; and control of the unit is had by means of the control conduit 36 that communicates with the rear opposing power chamber 20. The control conduit 36 is connected to a control valve, not shown, which in its normal condition supplies vacuum to the rear opposing power chamber 20, and which when actuated admits atmospheric pressure to the rear opposing power chamber 20. The diaphragm structure is normally biased into the position shown in the drawing by reason of the power piston return spring 38.

In order that the hydraulic chamber 10 will be compensated for loss or changes in volume of the hydraulic fluid in the system which is connected to its outlet port 12, the displacement piston 14 is provided with an axially extending opening or compensating port 40, which, in the normal condition of the parts shown in the drawing, communicates the opposite sides of the displacement piston 14. The rear side of the displacement piston 14 (that is the side forming its follow-up chamber 42) is provided with an external connection 44 by means of which it is communicated to a supply or reservoir of low pressure make-up fluid. The compensating port 40 is adapted to be closed off during power actuation of the unit by means of a poppet member 46 that is positioned in an enlarged or counterbored rear section 48 of the compensating port 40, and the inner end of which forms a shoulder or valve seat 50. The poppet or valve closure member 46 may be formed in any suitable manner, and, as shown in the drawing, is formed by means of a rubber coated tip 52 which is suitably fixed to the forward end of the push rod 28. The push rod 28 projects into the counterbore 48, and is loosely fastened to the piston 14 by means of a cross pin 54—which is tightly pressed into a suitable opening in the push rod 28, and the opposite end of which extends into a slotted opening 56 in the opposite sidewall or skirt section of the piston 14. Sufficient play is provided in the slotted openings 56 so that the valve closure member 52 will be out of sealing engagement with the shoulder 50 when the cross pin 54 engages the rear end of the slotted opening 56, and will be in sealing engagement with the shoulder 50 before the cross pin 54 engages the front end of the slotted opening 56. The cross pin 54 is prevented from coming loose by reason of a snap ring 58 positioned in a groove in the outer surface of the piston 14 in the region overlying the ends of the pin 54.

It will be seen that an appreciable load is asserted upon the end of the push rod 28 by means of the relatively heavy diaphragm structure, and that this load is cantilevered from the guide structure C, about to be described. According to principles of the present invention, the guide structure C is formed means of an annular generally cylindrical plastic part having an appreciable axial length, and through the central opening 59 of which the rod 28 slides. The guide structure C shown in the drawings is positioned in an enlarged or counterbored section in the rear end of the cylinder bore 10; and a seal is established with respect to the sidewalls of the cylinder bore by means of an O-ring 60 that is seated in a suitable groove 62 and the outside cylindrical surface of the guide structure C. In the embodiment shown in the drawing, a sliding seal is formed with respect to the push rod 28 by means of a U-packing 64 which is positioned in the bottom end of an enlarged section 66 of its central opening 59, with the lips of the seal projecting inwardly along the side walls of the enlarged opening 66 and rod 28, respectively. The U-packing 64 is held in place by means of a seal retainer 70 which is adapted to abut the end of the guide structure C outwardly of the enlarged sections 66, and which has an annular axially extending projection that extends in between the lips of the seal to hold the base of the seal in place. The retainer 70 is positioned against the shoulder 72 formed by the counterbore 59; and the guide structure C is held in place by means of an annular retaining washer 74 which abuts the outer end of the sealing structure C. The retaining washer 74 may be held in place by any suitable means; and as shown in the drawing, is held in place by means of the snap ring 76 which is fitted into the suitable groove in the sidewalls of the counterbore 59.

According to the principles of the present invention, the guide structure C is formed from a molded thermal setting resin, preferably of the phenol formaldehyde type which may contain suitable fillers to form the type of material commonly known as Bakelite. While the word Bakelite was coined as a trademark for this type of thermal setting resin containing a filler, it has become a generally accepted word for this type of material and it will be understood that the materials of any manufacturer can be used, and that any suitable combination of resin and filler can be used as will be well understood by those skilled in the art. While under certain conditions any thermal setting or thermal plastic resin can be used, it has been found that the thermal setting resins have less swelling when subjected to oils, and particularly vegetable oils such as used in the usual hydraulic braking fluid, than do the thermal plastic resins such as nylon or delron. It has further been found that an appreciable thickness of a tough smooth skin is formed on the mold surfaces of a thermal setting resin part which has considerably lower wear, and coefficient of friction, than does the inner portion of the thermal setting resin part. It is not known precisely why this is true, but it is believed that a very smooth finish requiring no further machining is formed by reason of the smooth surfaces that are usually provided on the molds, and it is further believed that there is an enrichment of the resin adjacent the mold surfaces; so that there is less filler in the tough smooth skin previously referred to. It has further been found that hydraulic oils and particularly those of the vegetable type as found in hydraulic braking fluid cause a swelling of the resin part, which is quite measurable at first, and then decreases over the life of the part so that it will compensate to some extent for the wear which occurs during the life of the structure. Because of the swelling of the plastic which can be expected, a clearance between the plastic part and the adjacent metal structures is provided which is approximately twice that which would normally be used between metal structures. Whereas for example the parts shown in the drawing would have approximately a two to four thousandths of an inch clearance between the rod 28 and a metal sleeve bearing, a clearance running between four and eight thousandths of an inch has been found to be necessary with the plastic part C. When the plastic part C is subjected to the oil, a swelling occurs which reduces this clearance by approximately one-half in a time interval of approximately one week; and thereafter a further slight growth occurs which will offset wear during the useful life of the structure.

Inasmuch as the sealing structure shown can be subjected to hydraulic pressures in the neighborhood of approximately 1,000 p.s.i. the O-ring 60 will preferably be positioned approximately in the center section of the guide structure C so as to provide a considerable area of the plastic over which shearing forces can be absorbed. According to still further principles of the present invention, the seal retainer 70 will preferably be made of plastic, so as to obviate machining, and also serve as a nonmetallic abutment for the piston 14. In the embodiment shown in the drawing, hydraulic pressure in the chamber 10 causes the piston 14 to return to the position wherein its outer end comes into abutment with the non-metallic retainer 70. If the retainer 70 were to be made of a metal, there would be an audible clicking noise produced during contact. After the rear end of the piston 14 abuts the retainer 70, further rearward movement of the push rod 28 causes the poppet 46 to move out of engagement of its seat 50 to open the compensating port 40. Thereafter the pin 54 abuts the rear end of the slotted end 56 to limit further rearward movement of the rod and diaphragm structure.

FIGURE 2 of the drawings shows a plastic guide C' which is identical to the guide C shown in FIGURE 1 excepting that four voids 78 have been formed longitudinally thereof for the purpose of reducing the thickness of plastic section which must be cured in the mold.

The embodiment of fluid pressurizing device shown in FIGURE 4 is of the type which intensifies or increases a hydraulic input signal received from any suitable pressure source, as for example, the master cylinder of an automotive hydraulic braking system. The embodiment shown in FIGURE 4 generally comprises a fluid pressurizing section B', very similar to the embodiment shown in FIGURE 1, and further includes a control valve structure D which causes the device to deliver a hydraulic pressure in its outlet 80 which at all times is greater and proportional to the hydraulic pressure delivered to its hydraulic input port 82. Those portions of the hydraulic pressurizing section A' which are similar to corresponding portions of the embodiment shown in FIGURE 1 are designated by like reference numeral, characterized further in that a prime mark is affixed thereto. The principal difference between the fluid pressurizing section A' shown in FIGURE 4, and the pressurizing section A of FIGURE 1 is that the plastic seal retainer member 70 is omitted in the embodiment shown in FIGURE 4 and its piston 14' is adapted to abut directly against the plastic guide C'. An annular metallic seal retainer 84 is pressed into the end of the enlarged section 66' of its central opening 59' to hold its seal 64' in place. The sealing and guiding structure C' is otherwise formed in the same manner as that of the previously described embodiments of guiding structure, and need not further be described.

In order that a complete understanding may be had of the device shown in FIGURE 4, a short description of the remaining portions will now be given. The fluid pressurizing chamber 10' and the valve structure D are arranged in parallel bores in a single casting 86 which has a generally cup-shaped section surrounding the open end of the fluid pressurizing chamber 10' to form the sidewalls 88 of its motor section B'. The motor section B' is completed by means of a diaphragm 90 which is sealingly snapped over the sidewall sections 88 to form the movable wall of the servomotor. The diaphragm 90 is suitably stiffened by a cup-shaped diaphragm plate 92 positioned on the inner end of the diaphragm 90. The diaphragm plate 92 seats up against a suitable shoulder 94 on the push rod 28', and the diaphragm is held in place by means of a suitable snap ring 96. The diaphragm 90 and casting 86 form a variable pressure chamber 98 to which atmospheric pressure is normally communicated; and the diaphragm structure is normally biased in the position shown in the drawing by means of the piston return spring 100.

As previously mentioned, control of the unit is had by means of the control valve structure D which is positioned in a longitudinally extending bore 102 that opens outwardly of the casting member 86. The control valve structure D includes a hydraulic actuating piston 104 situated in the inner end of the bore 102, so that it is subjected to the inlet pressure from the hydraulic inlet connection 82; and further includes a reaction piston 106 which is subjected to the hydraulic output pressure of the chamber 10'. The reaction piston 106 has a portion 108 which extends through the valve structure for abutment with the actuating piston 104. The servo motor B' is actuated by communicating vacuum to the variable pressure chamber 98 through the control conduit 109; and control of this vacuum is had by means of suitable valve structure that is positioned between the actuating piston 104 and the reaction piston 106.

The center section of the bore 102 is sealed off from hydraulic pressure at the inlet and by reason of annular cup packing 110 on the actuating piston 104; and the other end of the bore is sealed off by an annular sealing structure 112 which extends between the piston 106 and sidewalls of the bore 102. Suitable seals 114 and 116 are provided in the external and internal surfaces of the annular sealing structure 112 to affect seal with respect to the bore 102 and piston 106 respectively. The center section of the bore 102 is formed into an atmospheric valve chamber 118, a control chamber 120, and a vacuum chamber 122 which are spaced apart in that order between the actuating piston 104 and the reaction piston 106. The actuating piston 104 is provided with a tubular projection 124 which surrounds the stem portion 108 of the piston 106, and the end of which forms the atmospheric valve seat 126. A cup seal 128 is positioned between the tubular member 124, and the sidewalls of the bore 102 to separate the atmospheric chamber 118 and the control chamber 120. The control chamber 120 is separated from the vacuum chamber 122 by means of an annular member 130 which is suitably sealed with respect to the sidewalls of the bore 102 and the center opening of which forms the vacuum valve seat 132. The atmospheric valve seat 126 is positioned generally concentrically within the vacuum valve seat 132. The valve seats 126 and 132 are adapted to be abutted by an annular poppet member 134 having an inner lip portion 136 which forms a seal with respect to the stem 108 of the piston 136. The poppet member 134 is suitably stiffened and is biased toward the valve seats by means of a coil spring 140 which produces a suitable sealing force with respect to the valve seats. Vacuum is continually communicated to the vacuum chamber 122 through the vacuum connection 142. Atmospheric pressure is continually communicated to the atmospheric chamber 118 through the atmospheric connection 144; and is thence communicated to the inside of the tube 124 through the openings 146.

In the normal condition of the valve shown in the drawing, the actuating piston 104 is in an extreme left hand position wherein the atmospheric valve seat 126 is out of engagement with the poppet member 134. In this position atmospheric pressure flows through inside of the tube 124 past the valve seat 126 to the control conduit 109, and variable pressure chamber 98. When it is desired to actuate the unit, hydraulic pressure is communicated to the inlet connection 82; whereupon piston 104 causes the atmospheric valve seat 126 to move into engagement with the poppet member 134 to close off atmospheric communication with the control chamber 120, and thereafter lift the poppet member 134 from the vacuum valve seat 132 to communicate vacuum with the variable pressure chamber 98. The subsequent decrease in pressure in the variable pressure chamber 98 causes atmospheric pressure to move the diaphragm 90 inwardly to close off the compensating port 40' and thereafter generate pressure in the hydraulic chamber 10'. The outer end of chamber 102 is suitably closed off as by the end plate 148; so that the pressure which is generated in hydraulic pressurizing chamber 10' is exerted against the reaction piston 106 to balance off the force being applied to the actuating piston 104, and thereby move the valve structure into a lap position as is well known in the art. There is thereby produced a vacuum in the variable pressure chamber 98 which is generally proportional to the hydraulic pressure being supplied to the inlet 82 so that the motor B' produces a hydraulic outlet pressure in the connection 80 which is greater than, and always proportional to, the hydraulic inlet pressure supplied to the connection 82.

It will be apparent that the objects heretofore enumerated, as well as others, have been accomplished and that there has been provided a guiding and sealing structure, having particular advantages in hydraulic pressurizing devices. The guide is cheap and inexpensive to make, does not require finish machining, and utilizes a plastic having a tough skin that provides a rigid guiding surface which does not have an appreciable cold set, and which does provide a low coefficient of friction with respect to reciprocating structures.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. In a support for reciprocating structure: a housing having an axially extending chamber therein, an annular cylindrical member of appreciable length having a slip fit in said chamber, said cylindrical member being formed of a rigid non-pressure deformable plastic and having an annular groove in its outer surface generally midway between its ends, a seal in said groove forming a seal with respect to the sidewalls of said chamber, said cylindrical member having a cylindrical opening therethrough, said opening having an enlarged section at one end forming a shoulder in said member, a cylindrical rod extending through said opening and having a sliding fit therewith, an annular U-packing seated against said shoulder formed by said enlarged section of said opening with its lips extending axially toward said one end of said enlarged section to effect a sliding seal with said rod, an annular seal retainer member positioned against said one end of said plastic cylindrical member to close off said enlarged section and provide a predetermined space for said U-packing, and abutment means locating and axially holding said members together in said chamber, whereby an efficient guiding and sealing structure is provided having low friction.

2. In a support for reciprocating structure: a housing having an axially extending chamber therein, an annular cylindrical member of appreciable length having a slip fit in said chamber, said cylindrical member being formed of a molded rigid non-pressure deformable plastic and having an annular groove in its outer surface generally midway between its ends, a seal in said groove forming a seal with respect to the sidewalls of said chamber, said cylindrical member having a cylindrical opening therethrough having an enlarged section forming at one end, a shoulder in said member, a cylindrical rod extending through said opening and having a sliding fit therewith, an annular U-packing seated against said shoulder formed by said enlarged section of said opening with its lips extending axially toward said one end to effect a sliding seal with said rod, an annular plastic seal retainer member positioned against said one end of said plastic cylindrical member to close off said enlarged section of said opening and provide a predetermined space for said U-packing, said retainer having an axially extending projection which extends between the lips of said U-packing to hold said U-packing in place, and abutment means locating and axially holding said members in place, whereby an efficient guiding and sealing structure is provided having low friction.

3. In a fluid pressurizing device for automotive hydraulic braking fluids and the like: a cylinder housing having an axially extending bore therein, a hydraulic piston in said bore, an annular generally cylindrical member of appreciable length having a slip fit in said bore outwardly of said hydraulic piston, said annular member being formed of a molded thermal setting plastic and having an annular groove in its outer surface, a seal in said groove forming a seal with respect to the sidewalls of said bore, said cylindrical member having a molded cylindrical opening therethrough which is enlarged at its inner end, said opening being in its molded condition, a cylindrical rod connected to said piston and extending through said opening and having a sliding fit therewith, an annular U-packing seated in the bottom of said enlarged section of said opening with its lips extending axially inwardly to effect a sliding seal with said rod, an annular plastic seal retainer member of the same external diameter as said cylindrical member and positioned against said inner end of said plastic cylindrical member to close off said enlarged section of said opening and provide a predetermined space for said U-packing, said retainer member having an axially extending projection which extends between the lips of said U-packing to hold said U-packing in place, said plastic seal retainer acting as a return stop for said piston, and abutment means locating and axially holding said members fixed in said bore, whereby an efficient guiding and sealing structure is provided having low friction.

4. In a fluid pressurizing device for automotive hydraulic braking fluids and the like: a cylinder housing having an axially extending chamber therein that is enlarged at its outer end, an annular generally cylindrical member of appreciable length having a slip fit in said enlarged portion of said chamber, said annular member being formed of a molded thermal setting plastic and having an annular groove in its outer surface, a seal in said groove forming a seal with respect to the sidewalls of said chamber, said cylindrical member having a molded cylindrical opening therethrough which is enlarged at its inner end, said opening being in its molded condition, a cylindrical rod extending through said opening and having a sliding fit therewith, an annular U-packing seated in the bottom of said enlarged section of said opening with its lips extending axially inwardly to effect a sliding seal with said rod, an annular seal retainer member positioned against the inner end of said cylindrical member to provide a predetermined space for said U-packing, and abutment means locating and axially holding said members together in said enlarged chamber, whereby an efficient guiding and sealing structure is provided having low friction.

5. In a fluid pressurizing device having a flexible wall means adapted to drive a piston: a cylinder housing having an axially extending bore that is counterbored at its outer end to form a shoulder therein, an annular generally cylindrical member of appreciable length having a sliding fit in said counterbore, said annular member being formed of a rigid non-pressure deformable plastic and having an annular groove in its outer surface, a seal in said groove forming a seal with respect to the sidewalls of said counterbore, said cylindrical member having a molded cylindrical opening therethrough, said opening being in its molded condition, a cylindrical rod connecting said flexible wall means and said piston extending through said opening and having a sliding fit therewith, means forming a sliding seal between said rod and said plastic member, and an annular seal retainer positioned between the end of said cylindrical member and said shoulder and axially holding said member in place, whereby an efficient guiding and sealing structure is provided having low friction.

References Cited in the file of this patent
UNITED STATES PATENTS

| | | |
|---|---|---|
| 2,639,198 | Kirkham | May 19, 1953 |
| 2,864,632 | Hupp | Dec. 16, 1958 |
| 2,974,494 | Rike | Mar. 14, 1961 |
| 2,981,573 | Reuter | Apr. 25, 1961 |